United States Patent

[19] Matsuda

[11] Patent Number: 5,808,756
[45] Date of Patent: *Sep. 15, 1998

[54] IMAGE READING DEVICE AND DENSITY CORRECTION METHOD FOR READ IMAGES

[75] Inventor: Shinya Matsuda, Kyoto, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 785,215

[22] Filed: Jan. 17, 1997

[30] Foreign Application Priority Data

Jan. 19, 1996 [JP] Japan .................................. 8-007373

[51] Int. Cl.$^6$ ..................................................... H04N 1/04
[52] U.S. Cl. .......................... 358/474; 358/475; 358/488; 358/493; 358/464
[58] Field of Search ..................................... 358/474, 464, 358/462, 488, 448, 486, 406, 408, 471, 497, 475, 449, 461, 401, 463, 505, 501, 504, 509, 516, 520, 525, 493, 512; 382/286, 291, 319, 318; 250/208.1, 234–236, 201.7; 355/75, 25

[56] References Cited

U.S. PATENT DOCUMENTS

| | | | |
|---|---|---|---|
| 5,084,611 | 1/1992 | Okisu et al. .................... | 250/208.1 |
| 5,276,530 | 1/1994 | Siegel ............................. | 358/406 |
| 5,362,958 | 11/1994 | Ando ............................. | 250/208.1 |
| 5,377,019 | 12/1994 | Okisu et al. ................... | 358/464 |
| 5,416,609 | 5/1995 | Matsuda ........................ | 358/493 |
| 5,497,236 | 3/1996 | Wolff et al. ................... | 358/474 |
| 5,616,914 | 4/1997 | Matsuda et al. .............. | 358/474 |
| 5,659,404 | 8/1997 | Matsuda ........................ | 358/497 |
| 5,677,776 | 10/1997 | Matsuda ........................ | 358/463 |
| 5,705,806 | 1/1998 | Matsuda et al. .............. | 358/512 |

*Primary Examiner*—Edward L. Coles, Sr.
*Assistant Examiner*—Cheuk Fan Lee
*Attorney, Agent, or Firm*—McDermott, Will & Emery

[57] ABSTRACT

An image reading apparatus for book-like document includes a height detecting device which detects a height of the document, a luminance detecting device which detects a luminance of a background portion of the document image, a gloss calculating device which calculates gloss of a surface of the document in accordance with the height and the luminance, a luminance calculating device which calculates luminance corresponding to a background portion of the document image in accordance with the gloss and the height, a selecting device which selects either the detected luminance or the calculated luminance, and a density correcting means for correcting a density of the image data in accordance with said selected luminance.

10 Claims, 14 Drawing Sheets

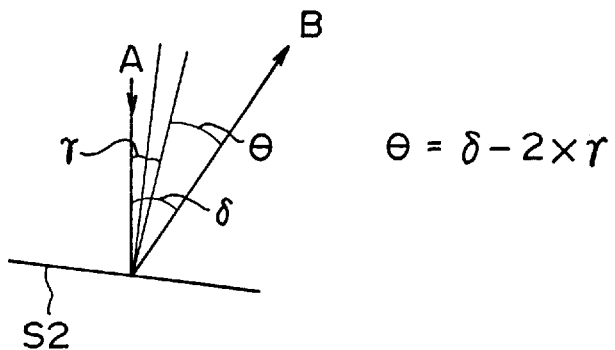
Fig.4(A) $\theta = \delta - 2 \times \gamma$
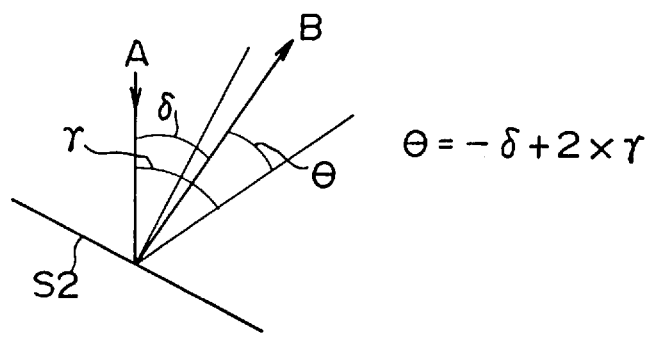
Fig.4(B) $\theta = -\delta + 2 \times \gamma$
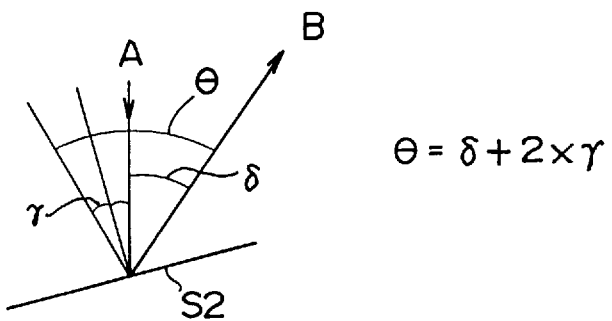
Fig.4(C) $\theta = \delta + 2 \times \gamma$

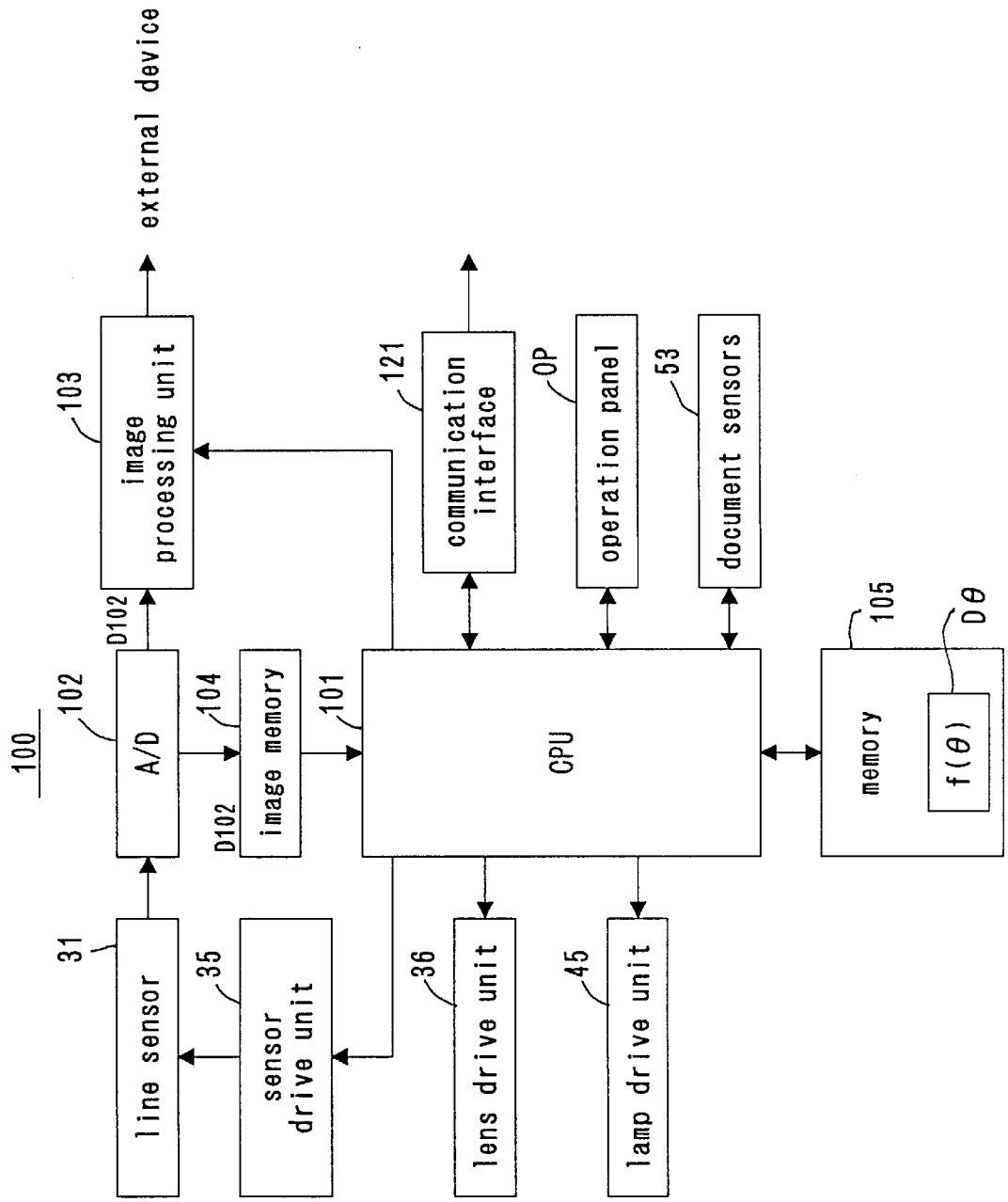

Fig. 15 (A) prior art
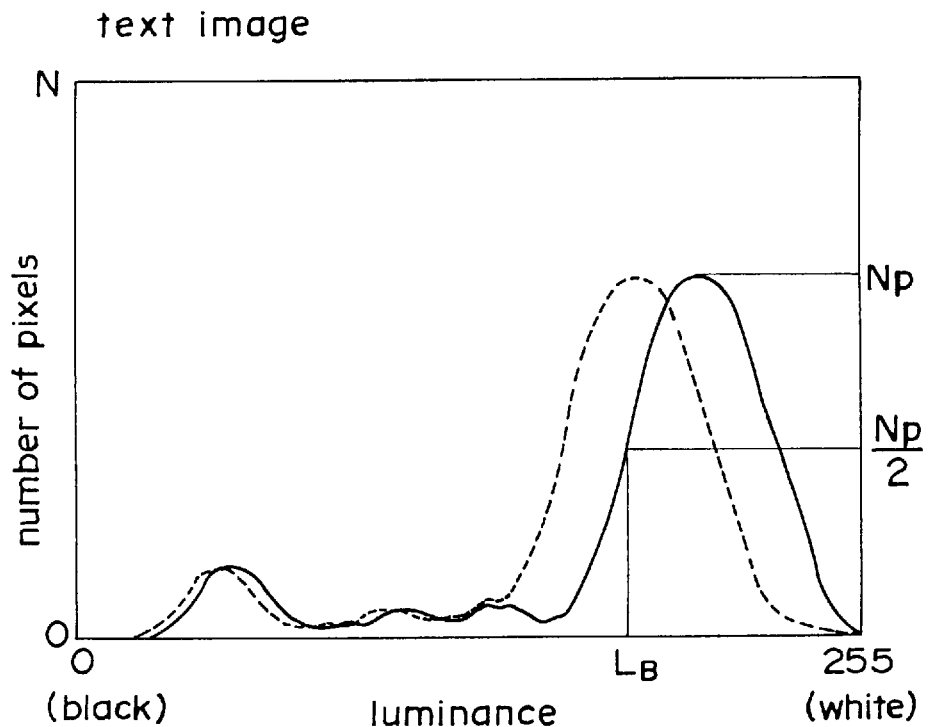
text image
Fig. 15 (B) prior art
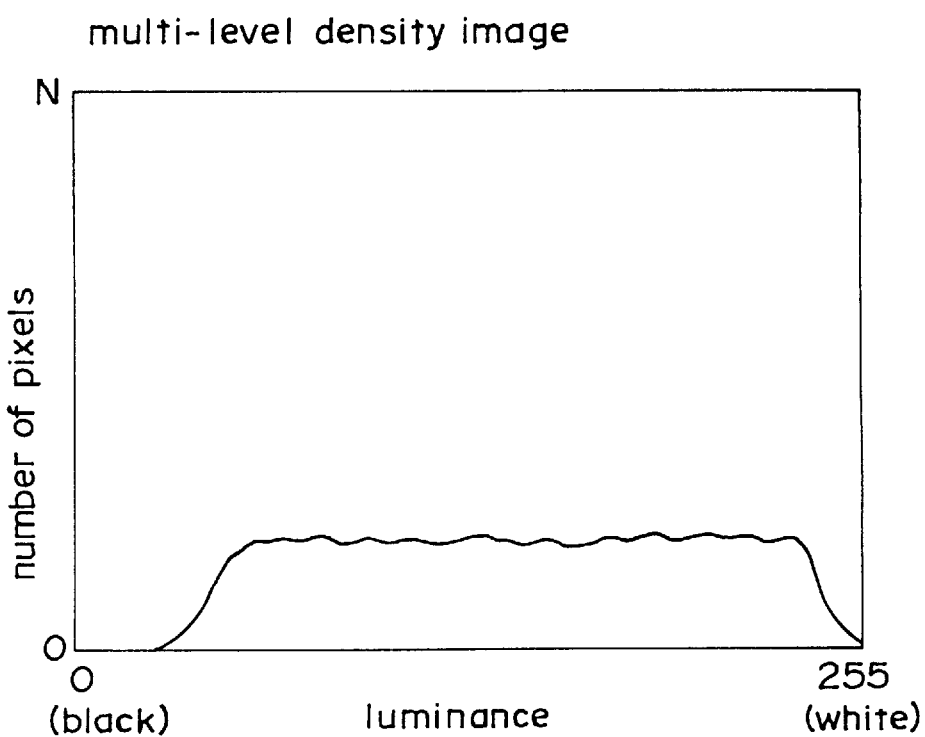
multi-level density image

IMAGE READING DEVICE AND DENSITY CORRECTION METHOD FOR READ IMAGES

BACKGROUND OF THE INVENTION

1. Field of the Invention

The present invention relates to an improved image reading device for bound reading documents such as books, magazines and the like.

2. Description of the Related Art

Image reading devices called book scanners have become commodities. In these devices, and image sensing unit is disposed above a document platen with an open space of several tens of centimeters in height between said image sensing unit and said document platen. When reading bound documents such as books, magazines and the like (hereinafter referred to as "book documents"), a user places the open book document face upward on the document platen. When the start key is turned ON, a lamp is lighted to illuminate the document, and scanning of the document surface (surface being read) starts. The images read in conjunction with the scan are sequentially output to an external device. If the external device is a printer, the image is reproduced in real time.

FIG. 12 shows the positional relationship between the image sensing unit and the book document, and FIG. 13 shows the relationship between the background density and the position of the book document in the lateral direction.

With the book document BD in an open state, the binding forms a shape referred to as the head and the right and left pages have a peaked shape, such that the document surface (the paper surfaces of the open pages) S2 is curved. Therefore, the opposing angles "a" of the imaging surface S3 change greatly compared to a sheet document (i.e., flat surfaced document) depending on the position in the lateral direction M2 on document surface S2. The opposing angle a is particularly small at both ends in the lateral direction M2 and at the binding, and the imaging conditions at these areas approach viewing the document surface S2 from the true horizontal position. In general, the paper used in book document BD has some gloss. That is, there is directivity in the light reflection of the document surface S. This directivity is such that the amount of light incident to the image sensing surface S3 becomes smaller as the opposing angle a becomes smaller. Furthermore, even when a light source is used to illuminate the document surface S which provides a uniform amount of light in the lateral direction M2, the angle of incidence of the illumination light differs depending on the position in the lateral direction M2 because the document surface S2 is curved. For these reasons the luminance of the document surface S is irregular as shown in FIG. 13. In the case of books and magazines and the like, the paper quality is such that deterioration occurs over time, often causing the background color (white background) near both edges to yellow and become tinged.

Accordingly, when reading a book document BD, the binding area and bilateral edges of the read image become darker, such that there is need of a process to correct the uneven luminance of the document surface S2 in the lateral direction M2 to improve the appearance when reproducing the read image (e.g., printout and the like).

FIG. 14 shows the relationship between the lateral direction M2 of the document surface S2 and the image sensing main scan direction M1.

Conventionally, in a prescan executed prior to a main scan, the luminance is checked for the pixels of one line in the main scan direction M1 which is perpendicular to the lateral direction M2 and a histogram is generated to determine the background luminance for each position (line) for various positions in a minutely dividing reading range in the lateral direction M2. In the main scan, the amount of illumination light is adjusted and image processing is executed to render uniform the background density of the read image in accordance with the background luminance determined during the prescan.

FIGS. 15(A) and 15(B) show luminance histograms of two kinds of images.

In FIG. 15(A), when the document image is a text image, a steep peak appears on the high luminance side of the luminance range because the majority of the document image is the background area (text background) as indicated by the solid line. When the low luminance side is designated LB, for example, a level on the low luminance side can be selected within two luminance levels, each of which have one half the number of pixels of the peak value Np. In FIG. 15(A), the peak of the luminance distribution shifts to the low luminance side at the dark areas of the binding and the like.

When the document image is a text image as described above, the background luminance LB can be selected because a definite peak appears in the luminance distribution of each line. When the document image is a multi-level density image such as a photograph and the like, definite peaks so not appear in the luminance distribution as shown in FIG. 15(B), such that a suitable background LB density often cannot be selected. That is, the differences in luminance mainly occurring on the curvature of the document surface cannot be accurately corrected.

Furthermore, for example, when a number of pages of a single volume book are conventionally read page by page, a long calculation time is necessary to select the background luminance because luminance histograms are generated for a plurality of positions in the lateral M2 direction during each reading cycle, thus being disadvantageous insofar as high speed reading is impaired by density correction.

SUMMARY OF THE INVENTION

A first object of the present invention is to output an excellent read image with suitable correction of uneven luminance of the document surface regardless of whether the document image is a two-level image or a multi-level image.

A second object of the present invention is to prevent the occurrence of faulty reading due to specular reflection of illumination light or external light on the document surface.

The aforesaid objects of the present invention are achieved by the methods described below.

A first method of correcting the density of a read image in an image reading device having a document platen for supporting a book being the reading object, and an image sensing means for converting a book image to electrical signals, and having a construction providing an open space capable of accommodating a document between said document platen and said image sensing means, said method including measuring the luminance and position in the height direction at a plurality of locations within a document surface, generating sheet gloss data expressing the spatial distribution of reflection light of the background on said document surface based on said measurement values, and when subsequently reading a document image of said document surface or other document surface, calculating the luminance of each reading area of a finely divided document surface based on said sheet gloss data when said reading area is assumed to be a background area, and setting a density correction amount for said reading area in accordance with said calculation value.

A second method of measuring the luminance and position in the height direction at a plurality of locations within a document surface, generating sheet gloss data expressing the spatial distribution of reflection light of the background on said document surface based on said measurement values, and when subsequently reading a document image of said document surface or other document surface, calculating the luminance of each reading area of a finely divided document surface based on said sheet gloss data when said reading area is assumed to be a background area, applying conversion rules corresponding to minimum luminance to actual measured luminance above a calculation value, and converting the actual measured luminance of said reading area to a density.

A third method of measuring the height position of a reading area to specify a positional relationship between said reading area and said image sensing means when reading a document image of another document surface.

A first image reading device having a document platen for supporting a book being the reading object, an image sensing means for converting a book image to electrical signals, and a signal processing unit for quantizing said electrical signals and outputting said data to an external device, and having a construction providing an open space capable of accommodating a document between said document platen and said image sensing means, wherein said signal processing unit measures the luminance and position in the height direction at a plurality of locations within a document surface, generates sheet gloss data expressing the spatial distribution of reflection light of the background on said document surface based on said measurement values, and when subsequently reading a document image of said document surface or other document surface, calculates the luminance of each reading area of a finely divided document surface based on said sheet gloss data when said reading area is assumed to be a background area, applies conversion rules corresponding to minimum luminance to actual measured luminance above a calculation value, and converts the actual measured luminance of said reading area to a density.

A second image reading device having a means for detecting document substitution, wherein sheet gloss data are generated each time a document is substituted, so as to substitute said newly generated sheet gloss data for previous sheet gloss data to calculate luminance.

A third image reading device wherein said signal processing unit has a display function for alerting an operator when suitable sheet gloss data are not obtained.

These and other objects, advantages and features of the present invention will become apparent from the following description thereof taken in conjunction with the accompanying drawings which illustrate specific embodiments of the invention.

BRIEF DESCRIPTION OF THE DRAWINGS

FIGS. 4(A), 4(B) and 4(C) show the relationship between document surface inclination and reflected light;

FIG. 9 is a block diagram of the signal processing unit of the book scanner;

FIGS. 15(A) and 15(B) show luminance histograms of two type of images.

In the following description, like parts are designated by like reference numbers throughout the several drawings.

DESCRIPTION OF THE PREFERRED EMBODIMENTS

In the following specifications, document surface "luminance" is defined as the degree of brightness of a document surface viewed from an image sensing means. The term "positional relationship" is defined as the three-dimensional positional relationship including an opposing angle of the reading area and the image sensing means.

An object of the present invention is to realize an image reading device capable of outputting excellent read images suitably corrected for uneven luminance of a document surface regardless of whether the document image is a two-level image or a multi-level image.

In general, book documents are comprised of a plurality of paper sheets of the same material quality. If the material quality is identical, the gloss (light reflection characteristics) will be virtually the same of the document surfaces. Accordingly, when a plurality of document surfaces are sequentially read one by one and the gloss of a first document surface is measured, then background luminance for the second and subsequent reading can be made from based on the initially calculated gloss. When measuring gloss, it is necessary to read an image surface having a comparatively large ratio of background (white background in the case of paper sheets). Book documents having mainly multi-level images such as photographs and the like may be handled by first reading a page having mainly text (two-level image) such as explanatory drawings.

The term "luminance" is described below.

Figure 1:
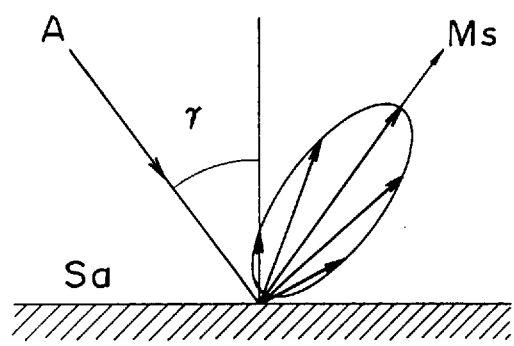
FIGS. 1(A) and 1(B) are illustrations of light reflection to describe gloss.
Figure 1:
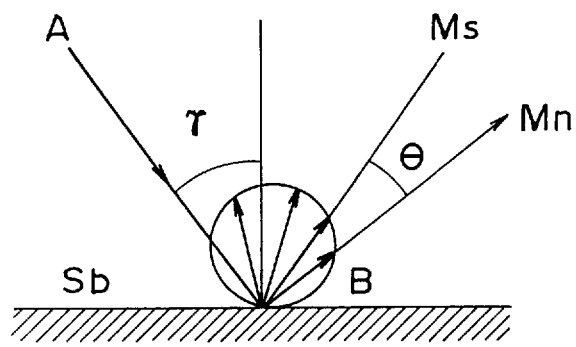

FIG. 1 shows light reflection to illustrate gloss.

In general, glossy surface Sa is said to have a large ratio of regular reflection component within the reflected light. That is, when light A impinges the surface Sa at an incident angle γ as shown in FIG. 1(A), a large part of the incident light A is reflected in the regular reflection direction Ms. As shown in FIG. 1(B) on the other hand, there is no reflection directivity at surface Sb which is not glossy, and incident light A is reflected more or less equally in various directions.

The amount of light R of light B reflected in the direction Mn inclined at an angle θ (hereinafter referred to as "inclination angle θ")) relative to the regular reflection direction Ms is expressed as the coefficient f(θ) of the inclination angle θ in Equation 1 below.

$$R = I \times r \times f(\theta) \tag{1}$$

I: amount of incident light
r: reflectivity

Since the reflectivity r is the ratio of the amount of incident light relative to the amount of regular reflection light, f(θ) expresses the ratio of the amount of light R of light A reflected in the direction Mm relative to the amount of regular reflection light. In the present specifications, f(θ) is defined as the degree of gloss at inclination angle θ.

Figure 2A:
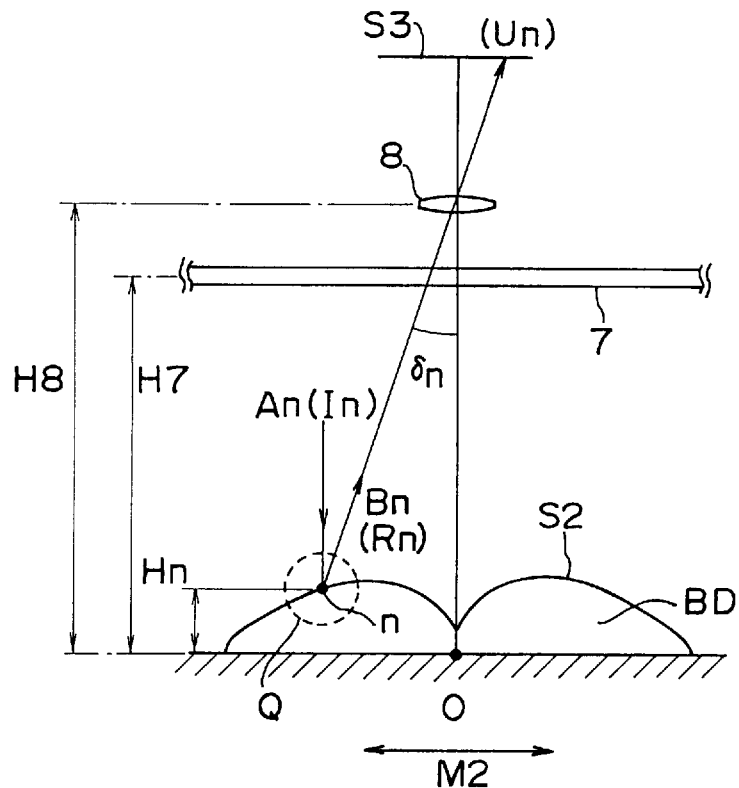
FIGS. 2(A) and 2(B) show the positional relationship between a document surface and image sensing surface.
Figure 2B:
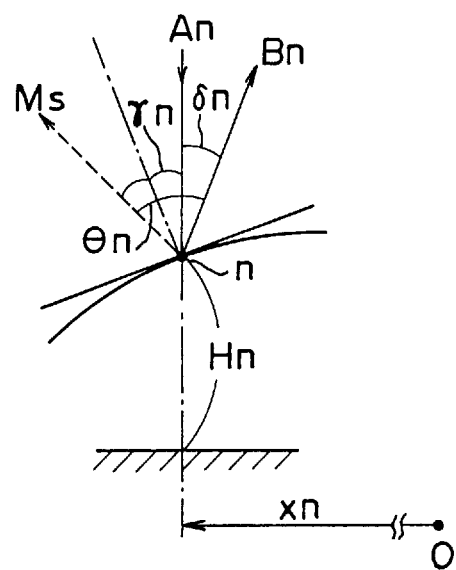

FIG. 2 shows the positional relationship between document surface S2 and image sensing surface S3. FIG. 2(B) is an enlargement of area Q circumscribed by a dashed line in FIG. 2(A).

The amount of light R of light B traveling toward image sensing lens 8 within the light reflected at a random point n on document surface S2 is expressed by Equation (2) below.

$$Rn = In \times rn \times f(\theta n) \tag{2}$$

In: amount of incident light at point n
rn: reflectivity at point n
θn: inclination angle in the direction of travel of reflection light Bn relative to the regular reflection direction Normally, reflectivity is constant within document surface S2. Although, reflectivity is occasionally the ratio of the amount of incident light to regular reflection light at a specific incident angle (75° in the case of paper), the ratio between the amount of incident light and regular reflection light remains virtually unchanged even if the incident angle changes. The paper reflectivity rj of the background of a document image is assumed to be constant regardless of the area within document surface S2 (refer to FIG. 3). That is, the amount of regular reflection light does not change whatever the angle of incidence of the light.

$$rj = r \tag{3}$$

The amount of incident light In at point n is a function of the brightness of light source 7 and the distance from light source 7 to document surface S2. When light source 7 is a linear light source extending infinitely in the lateral direction M2 of an open book document BD, and it is assumed that the illumination light expands uniformly within a plane perpendicular to light source 7, the amount of incident light In at point n can be expressed by Equation (4) below.

$$In = a \times Io/(H7 - Hn) \tag{4}$$

a: constant value
Io: brightness of the light source
H7: distance from the document platen to the light source
Hn: height of the document surface (i.e., the distance from the document platen to point n)

The amount of reception light Un indicating the brightness at point n on the image sensing surface S3 is a function of the amount of reflection light Rn, the distance D from the document surface S2 to lens 8 (=H8−Hn), and the image sensing angle δn, and is expressed by Equation (5) below.

$$U = b \times R \times \cos 3\delta / (H8 - Hn)2 \tag{5}$$

b: constant value
cos 3δ: drop in amount of light caused by the lens

Using the aforesaid Equations (2) through (5), the amount of reception light Un can be expressed by Equation (6) below.

$$\begin{aligned} Un &= b \times In \times rn \times f(\theta n) \times \cos 3\delta n/(H8 - Hn)2 \\ &= b \times a \times Io/(H7 - Hn) \times r \times \\ & \quad f(\theta n) \times \cos 3\delta n/(H8 - Hn)2 \\ &= c \times f(\theta n) \times \cos 3\delta n/[(H7 - Hn) \times (H8 - Hn)2] \end{aligned} \tag{6}$$

c: constant value

When the distance in the lateral direction M2 between a reference point O and point n is designated xn, cos δn can be expressed by Equation (7) below.

$$\begin{aligned} \cos \delta n &= 1/(1 + \tan 2\delta)1/2 \\ &= xn/[xn2 + (H8 - Hn)2]1/2 \end{aligned} \tag{7}$$

Therefore, the amount of reception light Un can be expressed by Equation (8) below using xn, and function g(xn,Hn) of Hn.

$$Un = c \times g(xn, hn) \times f(\theta n) \tag{8}$$

Equation (8) is an operational expression for computing background luminance based on the degree of gloss.

"Calculation of Constant c"

On an open-faced book document BD, the points at which the direction toward lens 8 aligns with the regular reflection direction Ms, i.e., points m at which θ=0, are individual points on the lateral page. These points m are locations which appear brightest as viewed from the image sensing surface S3. Since the gloss f(θ) becomes 1 at points m, the constant c can be specified if the positions of points m are determined.

Figure 3A:
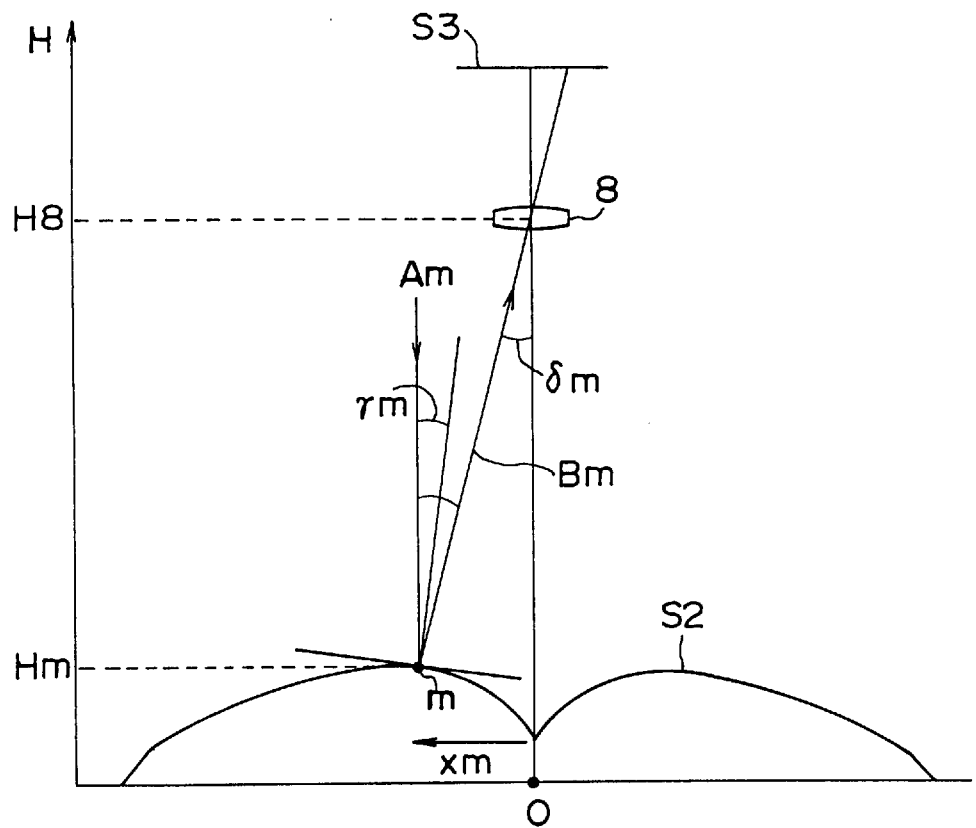
FIGS. 3(A) and 3(B) illustrate the principle of calculating constants.
Figure 3B:
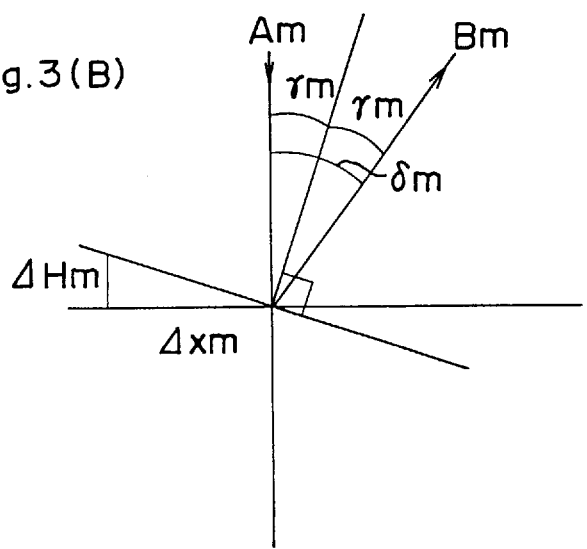

FIG. 3 illustrates the principle for calculating constant c.

At point m (xm,Hm), the image sensing angle δm is double the incidence angle γm of illumination light Am.

$$\delta m = 2 \times \gamma m \tag{9}$$

The values δm and γm have the relationships described below.

$$\tan \delta m = xm/(H8 - Hm) \tag{10}$$

$$\tan \gamma m = \Delta Hm / \Delta xm \tag{11}$$

xm: distance between point m and reference point O
Hm: distance between point m and lens 8
Δxm: minute change of distance xm
ΔHm: minute change of distance Hm The value tan γm expresses the slope of the tangent of document surface S2 at point m, and can be determined from information (position information of points around point m) on the change in height of document surface S2. Since the position of point m is specific, the height of point m must be measured. The method for measuring height is a well known method for analyzing a read image. It is possible to measure height using three dimensional measuring methods such as the light section method and the like. It is unnecessary to measure the distance xm because the distance xm can be readily determined by the scanning speed and sampling cycle.

The image sensing angle δn and incidence angle γn at point n on document surface S2 can be determined using Equations (10) and (11), and is the derived value satisfies Equation (9), this point n is point m.

When searching for point m, the luminance distribution is checked for the line extending in a direction perpendicular to the lateral direction M2 which includes point m (i.e., a luminance histogram is generated). The background luminance LB is determined by specific elements as in conventional methods. For example, the luminance level on the low luminance side among two luminance levels and which has a number of pixels of ½ the peak value Np is designated the background luminance LB. The elements of calculating the background luminance LB are not limited to the aforesaid example. The number of pixels from the high luminance side may be counted, and said count value set so as to have this luminance as the background luminance LB.

If the background luminance LB is determined, the constant c can be calculated by means of Equation (12).

$$c = LB/g(xm, Hm) \qquad (12)$$

If the background area of document surface S2 is white in color, the constant c is large, whereas if said background area is dark, the constant c is small.

FIG. 4 shows the relationship between the inclination of document surface S2 and reflection light B.

The interrelationships among angle $\theta$, $\delta$, and $\gamma$ on one of the right and left pages of the open-faced book document BD are described by any of the following expressions.

$\theta = \delta - 2 \times \gamma$ (refer to FIG. 4(A))

$\theta = 2 \times \gamma - \delta$ (refer to FIG. 4(B))

$\theta = \delta + 2 \times \gamma$ (FIG. 4 (C))

When moving forward in a clockwise direction, the inclination angle $\theta$ can be expressed by Equations (13) and (14) below.

$$\theta = \delta - 2 \times \gamma \text{ (when } 2 \times \gamma < \delta) \qquad (13)$$

$$\theta = 2 \times \gamma - \delta \text{ (when } 2 \times \gamma \geq \delta) \qquad (14)$$

Since the incidence angle $\gamma n$ of illumination light An and the image sensing angle $\delta n$ at a random point n on document surface S2 can be determined via Equations (10) and (11), the document surface S2 can be scanned and the amount of reception light Un measured at various inclination angles $\theta$, and the relationship between inclination angle $\theta$ and gloss $f(\theta)$ can be determined using Equation (8).

Figure 5A:
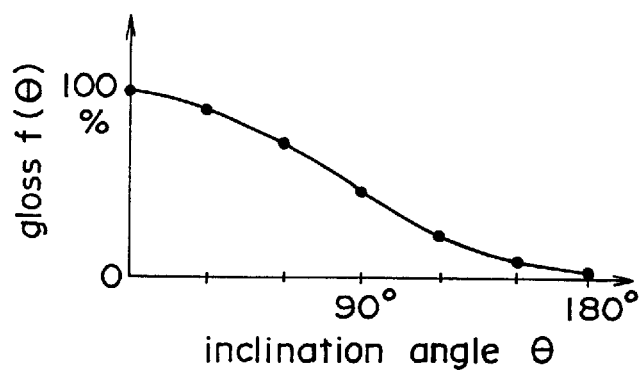
FIGS. 5(A) and 5(B) are graphs showing examples of the relationship between gloss and inclination angle of reflected light relative to a regular reflection direction.
Figure 5B:
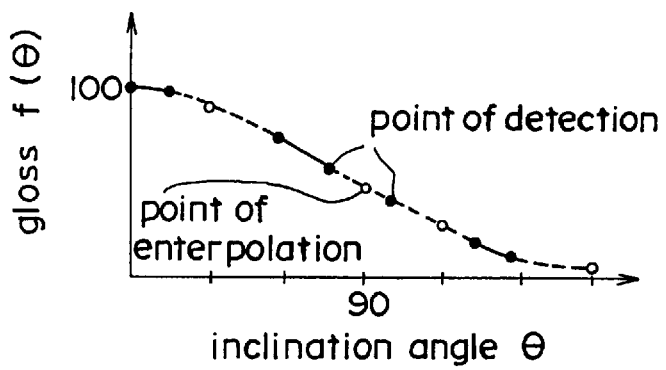

FIGS. 5(A) and 5(B) are graphs showing examples of a relationship between gloss $f(\theta)$ and the inclination angle $\theta$ relative to the regular reflection direction.

Since the document surface S2 has various degrees of curvature, the degree of gloss cannot be determined for the entire region a predetermined angular range in a single scan. In such circumstances, the necessary data can be generated by having the user change the placement of the open-faced book document BD, or interpolating or estimating with reference to data of the vicinity. In general, there is no practical problem when the gloss $f(\theta)$ is found in the angular range of 0° to 120°.

If the gloss $f(\theta)$ of a specific predetermined angular range is stored in memory as paper gloss data, the background luminance (i.e., the luminance assumed when the read area is a background area) of each part of the finely divided area of document surface S2 can be determined based on Equation (8) without measuring the gloss of other document surfaces. Accordingly, suitable density correction can be accomplished even when the images of other document surfaces are multi-level images such as photographs, with the stipulation that the material quality of each document surface of book document BD is identical. The height of the read area may be determined to specify the position of the read area.

The effectiveness of the image reading device is improved if the substitution of book document BD is detected and the paper gloss data are updated at the occurrence of each such substitution. Furthermore, erroneous image reading can be avoided by alerting an operator when suitable paper gloss data cannot be obtained due to marked curvature of the document surface S2 or the reflection of exterior light.

Figure 6:
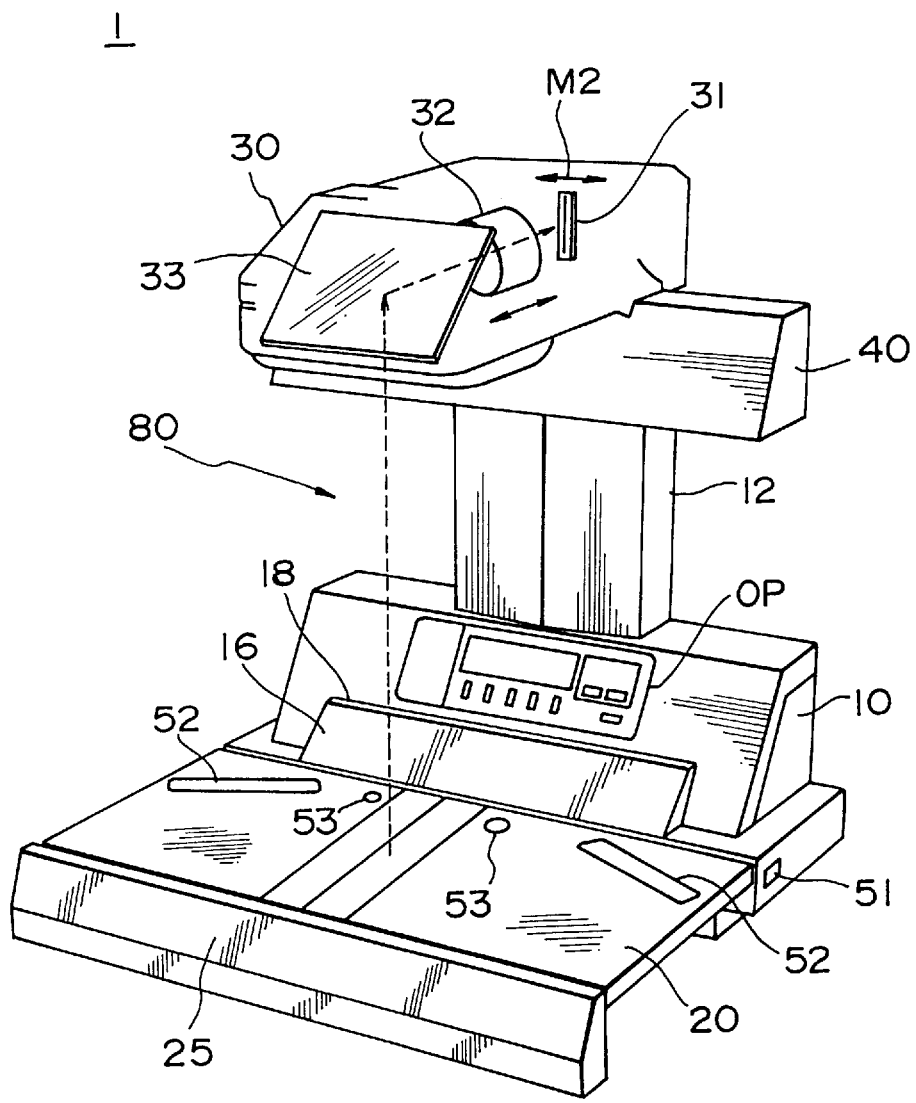
FIG. 6 is a perspective view of the exterior of a book scanner.
Figure 7:
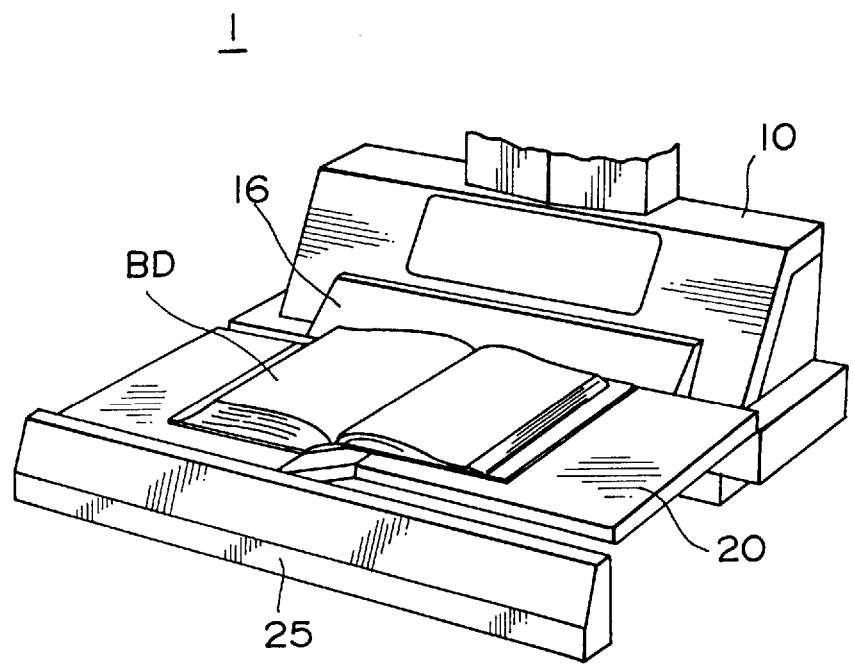
FIG. 7 shows book document placement.

FIG. 6 is a perspective view showing the exterior of a book scanner 1, and FIG. 7 illustrates the placement of a book document BD.

Book scanner 1 comprises a housing 10 which accommodates electrical circuits and the like, a dark color document platen 20 for supporting documents, image sensing unit 30 for converting a document image to electrical signals, and a lamp unit 40 for illuminating documents. Document platen 20 is arranged at the front side of the housing 10. Image sensing unit 30 is disposed above document platen 20, and supported by a support column 12 extending upward from the top surface of housing 10 in an overhanging arrangement. Lamp unit 40 is disposed below the bottom surface of image sensing unit 30 and is fixedly mounted to column 12. A space 80 between the document platen 20 and image sensing unit 30 is open relative to the device exterior so as to be freely accessible, and is of a size sufficient to accommodate the placement of book documents. The distance between the document platen 20 and image sensing unit 30 is 30 cm or more.

An operation panel OP is provided at the top front side of housing 10, and a range panel 16 is attached to the bottom edge to detect the height of the document surface. The front surface of range panel 16 is flat and glossy, and is inclined at an angle of 45° relative to the top surface of document platen 20. The top edge surface of range panel 16 functions as a white panel 18 used for shading correction. A main switch 51 is provided on the right side surface of housing 10 opposite operation panel OP.

A start key 52 is provided on bilateral sides of document platen 20 for a user to specify the start of the reading operation, and two document sensors 53 are embedded in the center area to detect the presence of a document. An armrest 25 is provided at the front side of document platen 20. Document sensors 53 are reflective type photosensors comprising a photoemitter element and a photoreceptor element. In order to detect the presence of a document, the photoemitter element and photoreceptor element may be disposed in opposition at opposite ends of open space 80. It is alternatively possible to detect the presence of documents via ultrasonic sensors, and mechanical sensors such as microswitches and the like rather than optical type sensors.

Image sensing unit 30 is provided with a line sensor 31 comprising a charge-coupled device (CCD) array, image forming lens 32, and mirror 33. A document image is formed on a photoreceptor surface of line sensor 31 via mirror 33 and image forming lens 32. Image forming lens 32 is reciprocally movable in front-to-back directions, and is positioned by an autofocus (AF) mechanism not shown in the drawings.

Line sensor 31 is movable horizontally along the lateral direction M2 (i.e., subscan direction) while maintaining the alignment direction of the CCD elements in a vertical direction. The document image is sensed two-dimensionally via the aforesaid horizontal movement. That is, in book scanner 1, a two-dimensional image plane is formed by the movement of line sensor 31. When an area sensor is used instead of line sensor 31, the photoreceptor surface becomes the image sensing surface. The main scan direction of the document image is the front-to-back direction on document platen 20, and is a vertical direction on the image sensing surface.

The book scanner 1 of the previously described construction is excellent image input means for reading book documents. A comprehensive copying system suitable for all kinds of documents can be constructed by combining book scanner 1 and a digital copying apparatus.

When using book scanner 1, a user places a book document BD in an open state on document platen 20, as shown in FIG. 7. At this time, book document BD is positioned by pressing it against the bottom edge of range panel 16. That is, the border of range panel 16 and document platen 20 is the reference line for document placement. The center of this reference line is reference position P0 (refer to FIG. 8(A)). Document platen 20 is constructed so that the right and left sides are independently movable vertically. Thus, the heights of the right and left pages when the book document is open can be set at the same height.

In book scanner 1, two scans (reading of a document image) are performed for a single document. In book document BD, it is necessary to adjust the focus for image sensing in accordance with the curvature of the page because the document surface is curved unlike unbound documents. A process to correct differences in luminance is also necessary. Therefore, the state of curvature is detected in a first scan (hereinafter referred to as "prescan"), and a second scan (hereinafter referred to as "main scan") is performed based on the detection result of the prescan. Image output to external devices is accomplished during the main scan. The direction of movement of the line sensor 31 during the main scan is a direction opposite the sensor movement during the prescan. The reading modes comprise a reading mode for reading both pages in a batch (a scanning condition similar to single sheet documents), and a reading mode for reading right and left pages separately. In either reading mode, a prescan and main scan is executed for each page.

Figure 8A:
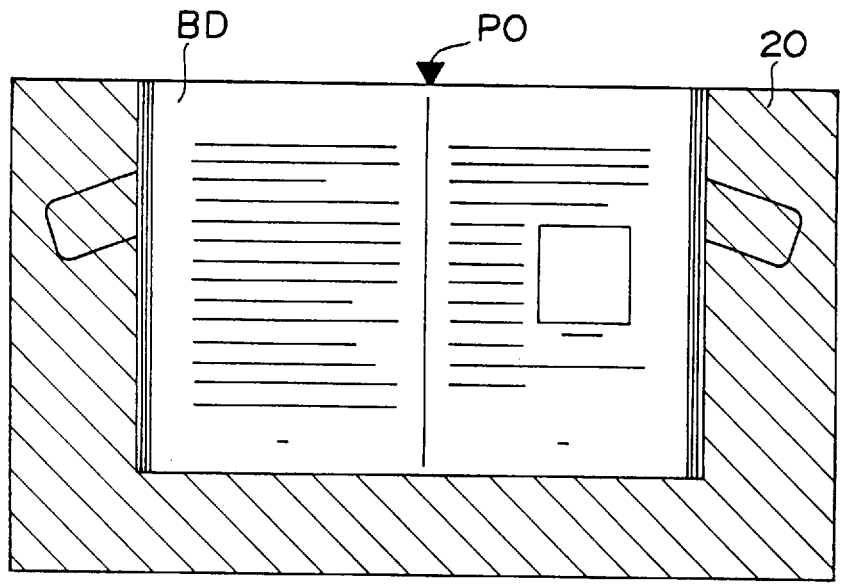
FIGS. 8(A) and 8(B) are plan views showing examples of book document reading.
Figure 8B:
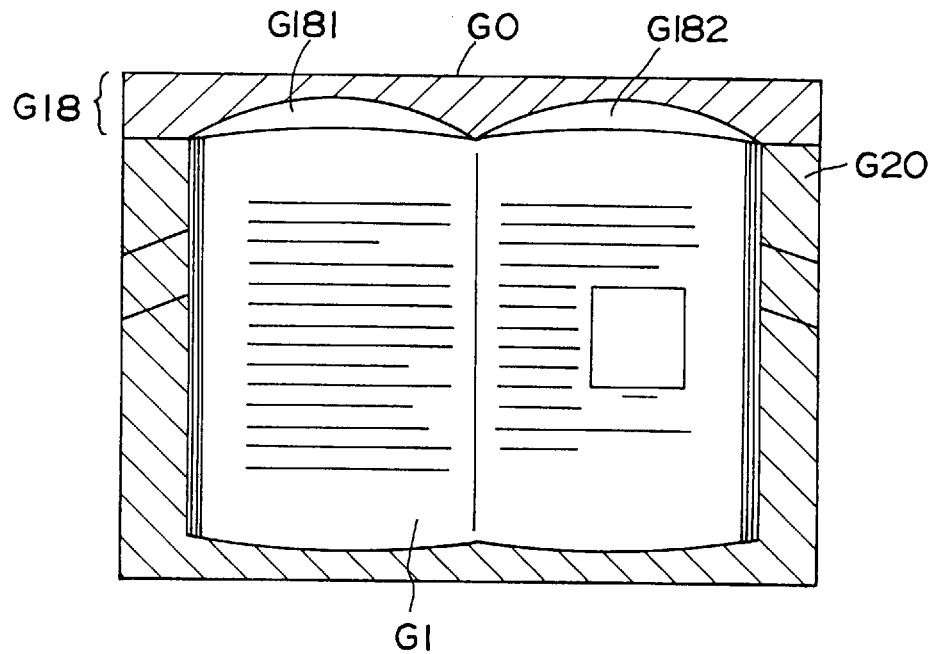

FIGS. 8(A) and 8(B) are plan views showing examples of the reading of a book document BD. FIG. 8(A) shows a book document BD placed on document platen 20, and FIG. 8(B) shows the read image G0.

The read image G0 comprises a document surface image G1 of the book document BD, an image G20 of document platen 20, and an image G18 of the reflection of range panel 16. The images G181 and G182 within image 18 indicate the shape of the end surface of the open book document BD (i.e., the region called the "head" of bound document). The region outside image G181 and G182 within image G18 is the background image of the reflected range panel 16. Since the boundary between image G18 and G20 is known to correspond to the aforesaid reference line, the height of the document surface can be calculated from the distance (number of pixels) between this boundary and the contour line. The boundary between image G1 and image G2 can be readily determined using the difference between the background color of the document surface and the color of document platen 20. If the boundary between image G1 and image G2 is determined, the end edge of book document BD on the image sensing surface is ascertained. If the height of the document surface is measured by the aforesaid image analysis, the change in the number of right and left side pages occurring as the pages are turned can be detected with greater accuracy than when a pressure sensor is provided on document platen 20 and the weight is measured for each right and left side of open book document BD.

The curvature of the top edge and bottom edge of image G1 is due to the variable height of the document surface. That is, the object nearest the image sensing surface is sensed as being larger. In the main scan, image processing is executed (image distortion correction) to correct the curved image G1 to an image when the document surface height is constant based on the document surface height information obtained in the prescan.

FIG. 9 is a block diagram of the signal processing unit 100 of book scanner 1.

The output of line sensor 31 is converted to, for example, 8-bit image data D102 by an analog-to-digital (A/D) converter 102.

In the prescan, after image data D102 are temporarily stored in image memory 104, said data are fetched by a central processing unit (CPU) 101. CPU 101 calculates the document surface height at each fine division position at equal spacing in the subscan range based on the aforesaid image data D102, and generates data for image distortion correction and density correction as preparation for the main scan. The content of the data generation process related to density correction is different from immediately after the placement of book document BD. That is, in the initial prescan of book document BD, a luminance histogram is generated based on the image data D102 of one line for each predetermined position in the subscan direction, and the background luminance LB is calculated (refer to FIG. 15) under predetermined conditions. The gloss $f(\theta)$ is calculated from the measured value of the height at each position and the calculated value of luminance LB, and the resultant value is stored in memory 105 as gloss data $D\theta$. In contrast, luminance histogram generation is omitted from the prescan of the second and subsequent cycles, and background luminance LB is calculated using Equation (8) for each predetermined position in the subscan direction based on the newly measured document surface height and the gloss data $D\theta$ stored in memory. The background luminance LB determined based on the luminance histogram or gloss $f(\theta)$ is used in density correction by image processing unit 103 during the main scan. In the main scan, image data D102 are transmitted from A/D converter 102 to image processing unit 103. Image processing unit 103 executes processing for converting luminance data to density data, and processing for image distortion correction arising from the curvature of the document surface, density correction, and masking to erase inadvertent images of the user's fingers holding the document. Image data subjected to predetermined image processing are output to an external device such as a copier or printer or the like.

CPU 101 controls a drive system including the sensor drive unit 35, lens drive unit 36, and lamp drive unit 45. Sensor drive unit 35 supplies predetermined clock signals to line sensor 31, and drive the scanner. Lens drive unit 36 accomplishes positional adjustment of image forming lens 32 in accordance with AF signals from CPU 101. The document sensors 53 and communication interface 121 are connected to CPU 101. Communication interface 121 function to enable bidirectional communication between CPU 101 and the external devices.

The density correction method for images read by book scanner 1 is described hereinafter.

Figure 10:
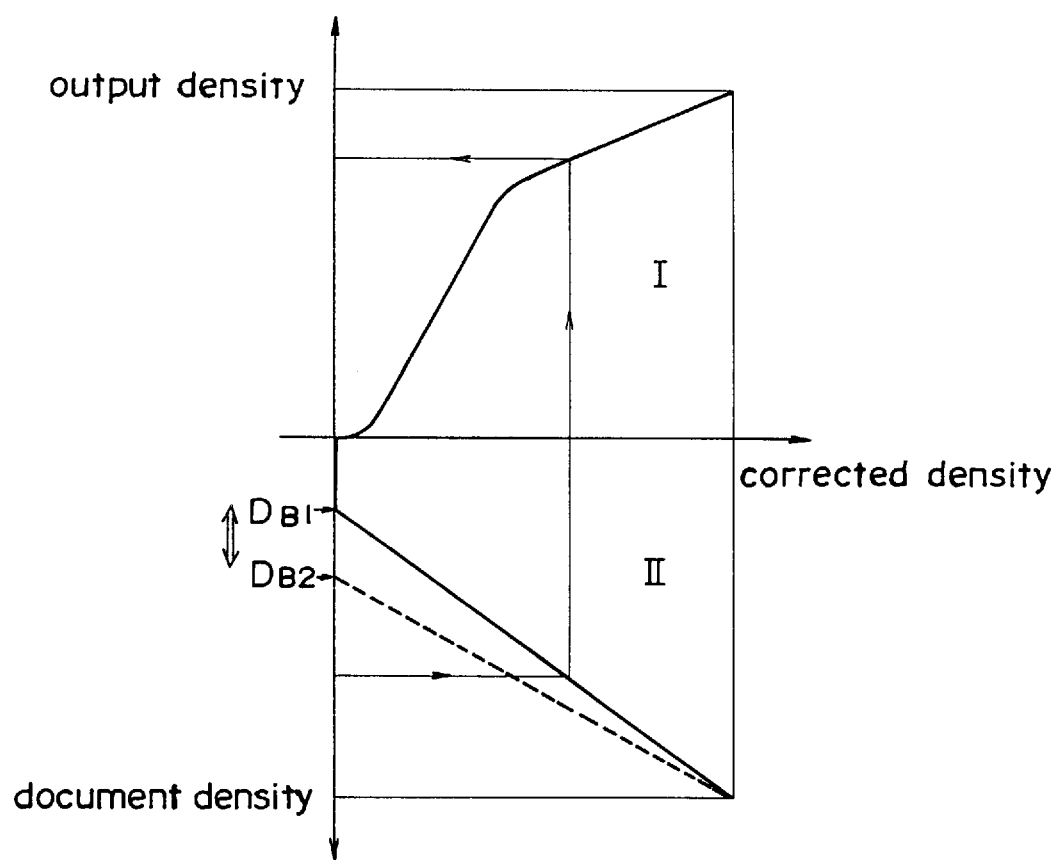
FIG. 10 is a graph showing the content of density correction.

FIG. 10 is a graph showing the content of density correction.

Image processing unit 103 converts luminance data DL (i.e., image data D102) expressing the amount of reception light of each pixel of the image sensing surface to density data Dd corresponding to visual characteristics pursuant to Equation (15) below.

$$Dd = \log(1/DL) \quad (15)$$

The second quadrant of FIG. 10 shows the density correction process relating directly to the present invention, that is the second quadrant shows the input/output (I/O) relationship of the process for correcting uneven luminance arising mainly from the curvature of a document surface. The vertical axis indicates the density level (document density) before correction, and the horizontal axis indicates the density (corrected density) after correction.

Image processing unit 103 corrects the density data Dd of each line in the subscan direction using a linear function to slice the background luminance DB resulting from logarithmic conversion of background luminance LB supplied by CPU 101. That is, the density data Dd below background density DB is set at a minimum value of the output density range (dynamic range), and the density data Dd above background density DB is multiplied by a constant coefficient and output. Since the maximum value of the output density range is fixed, the correction coefficient changes in accordance with the magnitude of the background density DB. Thus, the yellowing and color tingeing which occurs in newspaper for example is corrected, and the variable density between the character portion and the background portion becomes sharply clear in the output image. Since this correction is accomplished for each fine division position in the subscan range, the difference in luminance in parts of the document surface is corrected, and the read image of book document BD can be output as an image of identical quality as when reading an unbound document.

The first quadrant in FIG. 10 shows the input/output (I/O) relationship of the correction process when considering the density reproduction characteristics of the external device. In the example in FIG. 10, non-linear correction having different conversion characteristics for low density areas and high density areas is performed to increase halftone reproducibility.

The corrections of the second quadrant and the first quadrant may be realized using look-up tables, or using computation circuits. It is also possible to accomplish correction calculations via software.

Figure 11:
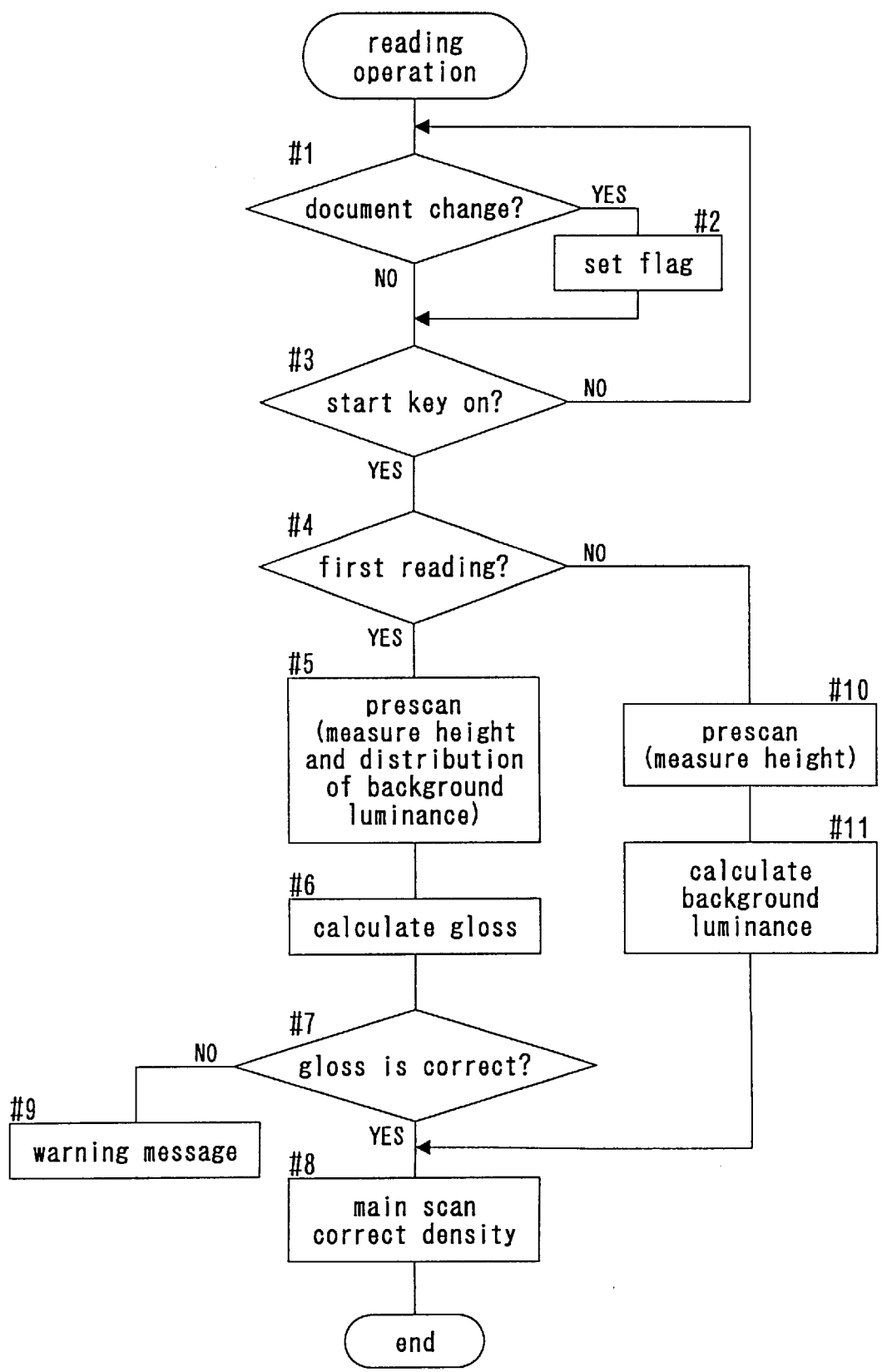
FIG. 11 is a flow chart of the reading operation.
Figure 12:
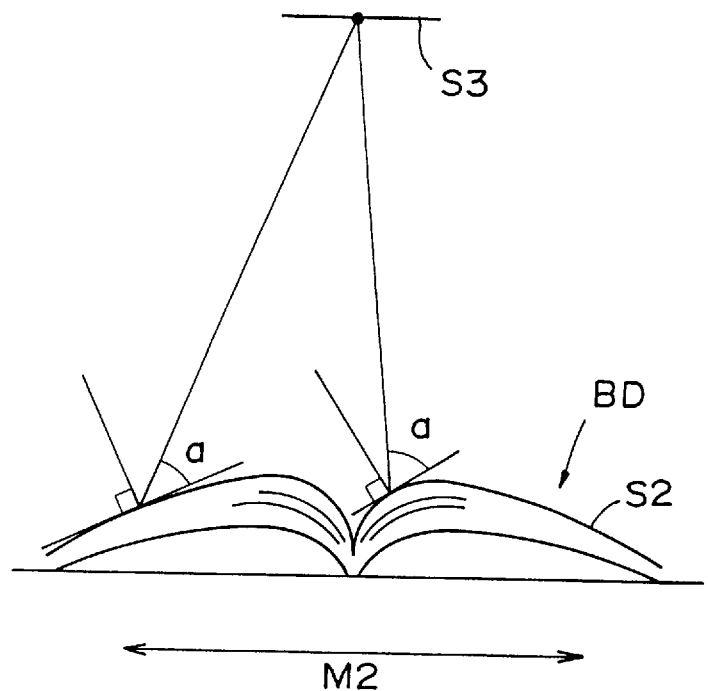
FIG. 12 shows the positional relationship between the image sensing unit and the book document.
Figure 13:
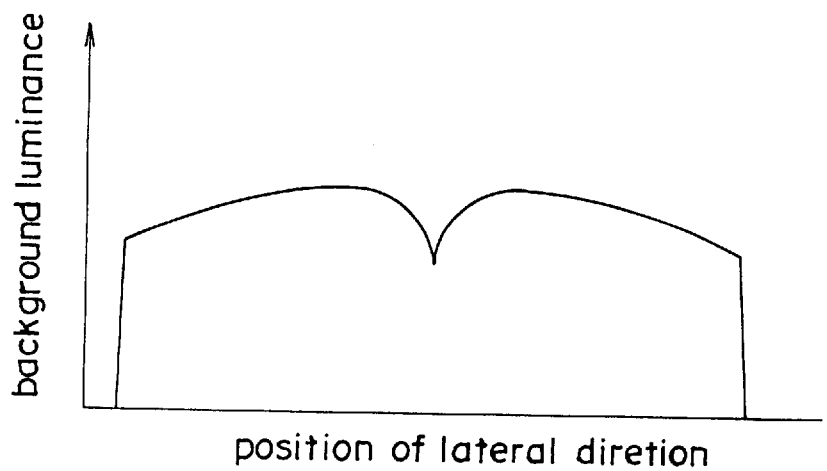
FIG. 13 shows the relationship between background luminance and the lateral direction position of the book document.
Figure 14:
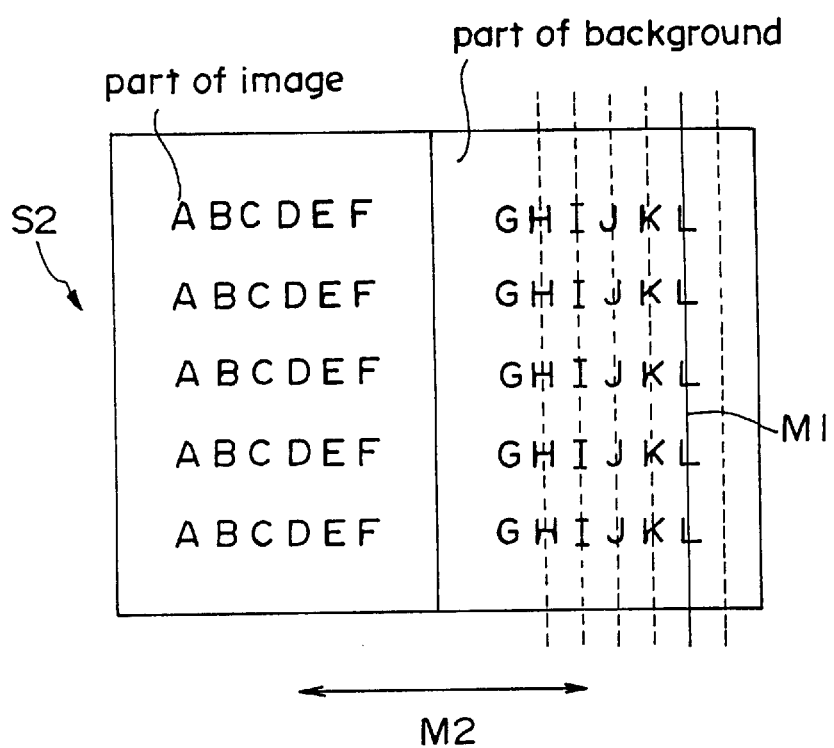
FIG. 14 shows the relationship between the lateral direction of the book document and the image sensing main scan direction.

FIG. 11 is a flow chart of the reading operation.

When the output of document sensor 53 changes from "no document" to "document set," it is determined that a user has substituted a document and a flag is set (#1, #2). The flag is also set when power is turned on and "document set" appears.

When the start key 52 is pressed, a check is made to determine whether or not this is a first reading after the flag has been set (#3, #4). If it is a first reading, the document surface height is measured in the prescan, and a luminance histogram is generated to obtain actual measured values of background luminance LB (#5). Then, gloss $f(\theta)$ is calculated, and a main scan is executed when suitable gloss data are obtained at the predetermined angular range (#7, #8). In the main scan, density correction is accomplished using actual measured values of background luminance LB obtained by calculating gloss $f(\theta)$.

A warning message is displayed when suitable gloss data are not obtained in the prescan (#9). For example, when the light reflection of the document surface has a narrow directivity (high gloss), the total amount of reception light of the image sensing surface is reduced, and the document is sensed as being dark. This phenomenon is similar to that when the amount of illumination light is reduced, and image quality is reduced due to the imaging signal signal-to-noise (S/N) ratio. When the gloss value falls below a constant value, the user is alerted to press the document smooth and flat.

In the case of the second and subsequent reading on the other hand, a prescan is executed to measure the document surface height (#10). The positional relationship between the read portion of the document surface and the image sensing surface can be specified by measuring the document surface height, and a determination can be made as to the inclination angle $\theta$ expressing the divergence between the regular reflection direction and the direction of the light reflected by the read area and approaching the image sensing surface. In the second and subsequent readings, calculations are made as to the degree of gloss corresponding to the inclination angle $\theta$ specified by the prescan from the aforesaid obtained gloss data, and the background luminance LB is calculated using Equation (8) (#11). Thereafter, in the main scan, density correction is accomplished using the background luminance LB determined from the aforesaid gloss data.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image reader for reading book-like documents placed on a document platen in a face upward condition, said image reader comprising:
   an image reading device which reads the document and for outputting image data;
   a height detecting device which detects a height distribution of the document;
   a luminance detecting device which detects a luminance of the document in accordance with said image data;
   a gloss calculating device which calculates gloss of a surface of the document in accordance with said height distribution and said luminance;
   a luminance calculating device which calculates luminance corresponding to the document image in accordance with said gloss and said height distribution; and
   a density correcting device which corrects a density of said image data in accordance with said calculated luminance.

2. The image reading apparatus as claimed in claim 1, wherein said gloss calculating device calculates gloss of the surface of the document when first reading is operated to the document.

3. The image reading apparatus as claimed in claim 2 further comprising:
   a memory which stores the gloss calculated by said gloss calculating device in first reading;
   wherein said gloss calculating device does not calculate the gloss when second reading is operated to the document.

4. The image reading apparatus as claimed in claim 1, wherein said gloss corresponds to an angle of the surface of the document to the image reading device.

5. The image reading apparatus as claimed in claim 1 further comprising,
   warning means for warning when a suitable gloss is not obtained by said gloss calculating means.

6. A method of processing an image of a book-like documents placed on a document platen in a face upward condition, the method comprising the steps of:
   reading the document on which the document is placed to outputting image data, detecting a height of the document, detecting a luminance of background of the document in accordance with said image data, calculating gloss of the document in accordance with said height and said luminance, calculating luminance corresponding to a background of the document in accordance with said gloss and said height, selecting said detected luminance when first reading is operated to the document, or, said calculated luminance when second reading is operated to the document, and correcting said image data in accordance with said selected luminance.

7. The method according to claim 6 further comprising;

warning when a suitable gloss is not obtained by said gloss calculating step.

8. A method of processing an image of a book-like documents placed on a document platen in a face upward condition, the method comprising the steps of:

executing a first prescan operation which includes steps of;
reading the document,
detecting a height of the document,
detecting a luminance of background of the document, and
calculating a gloss of a surface of the document, executing a first main scan operation after the execution of the first prescan operation which includes steps of;
reading the document,
correcting a density of an image data in accordance with the detected luminance, and
outputting a corrected image data, executing a second prescan operation after the execution of the first main scan operation which includes steps of;
reading the document,
detecting the height of the document, and
calculating luminance of the background of the document in accordance with said gloss, executing second main scan operation after the execution of the second prescan operation which includes steps of;
reading the document,
detecting the height of the document,
correcting the density of the image data in accordance with the calculated luminance, and
outputting corrected image data.

9. The method according to claim 8 further comprising;
a step of warning when a suitable gloss is not obtained by said gloss calculating step of the first prescan operation.

10. An image reader for reading book-like documents having a first document and a second document placed on a document platen in a face upward condition, said image reader comprising:

first image reading means for reading the first document and for outputting first image data;

first height detecting means for detecting a height distribution of the first document;

luminance detecting means for detecting a first luminance of the first document in accordance with said first image data;

gloss calculating means for calculating gloss of the first document in accordance with said first height distribution and said first luminance;

second image reading means for reading the second document and for outputting second image data;

second height detecting means for detecting a height distribution of the second document;

luminance calculating means for calculating second luminance corresponding to the second document image in accordance with said gloss and said second height distribution wherein said gloss of the first document is equal to a gloss of the second document; and density correcting means for correcting a density of said second image data in accordance with said second luminance.

* * * * *